US011539861B1

(12) United States Patent
Yang et al.

(10) Patent No.: US 11,539,861 B1
(45) Date of Patent: Dec. 27, 2022

(54) COLOR PLANE MISREGISTRATION DETERMINATIONS

(71) Applicants: Hewlett-Packard Development Company, L.P., Spring, TX (US); Purdue Research Foundation, West Lafayette, IN (US)

(72) Inventors: Yi Yang, West Lafayette, IN (US); Ki-Youn Lee, Pangyo (KR); Yousun Bang, Pangyo (KR); Mark Q. Shaw, Boise, ID (US); Jan Allebach, West Lafayette, IN (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/573,939

(22) Filed: Jan. 12, 2022

(51) Int. Cl.
*H04N 1/58* (2006.01)
*H04N 1/60* (2006.01)
*H04N 1/40* (2006.01)

(52) U.S. Cl.
CPC .......... *H04N 1/58* (2013.01); *H04N 1/40075* (2013.01); *H04N 1/6033* (2013.01)

(58) Field of Classification Search
CPC .......... H04N 1/00015; H04N 1/00023; H04N 1/00029; H04N 1/00031; H04N 1/00034; H04N 1/00037; H04N 1/00045; H04N 1/0005; H04N 1/00053; H04N 1/00055; H04N 1/00063; H04N 1/00068; H04N 1/00082; H04N 1/56; H04N 1/58; H04N 1/60; H04N 1/603; H04N 1/6033; H04N 1/6036; H04N 1/6038; H04N 1/6041; H04N 1/6044; H04N 1/6047
See application file for complete search history.

(56) References Cited

U.S. PATENT DOCUMENTS

| | | | | |
|---|---|---|---|---|
| 4,731,622 A * | 3/1988 | Hicks | .................. | H04N 1/50 347/116 |
| 6,408,156 B1 * | 6/2002 | Miyazaki | ............... | H04N 1/506 347/116 |
| 6,836,277 B2 * | 12/2004 | Tajima | ................... | H04N 1/506 399/160 |
| 7,911,644 B2 * | 3/2011 | Shiokawa | ............... | H04N 1/506 358/1.9 |
| 8,064,811 B2 * | 11/2011 | Sato | .................... | G03G 15/0194 347/116 |
| 9,477,193 B2 * | 10/2016 | Iwamoto | ............ | G03G 15/5058 |
| 11,330,144 B2 * | 5/2022 | Nakai | ..................... | H04N 1/60 |

* cited by examiner

*Primary Examiner* — Scott A Rogers
(74) *Attorney, Agent, or Firm* — Brooks Cameron & Huebsch PLLC

(57) ABSTRACT

In some examples, a device includes a printing device to generate an image on a substrate from a digital image, and a processor to: receive a scanned image of the image on the substrate, identify a plurality of image portions of the scanned image, identify horizontal color changes across a horizontal portion of the plurality of image portions, identify vertical color changes across a vertical portion of the plurality of image portions, compare the horizontal color changes and vertical color changes to corresponding horizontal color changes and corresponding vertical color changes of the digital image, and measure a presence of color plane misregistration, and the color, direction and magnitude of misregistration based on the comparison.

15 Claims, 5 Drawing Sheets

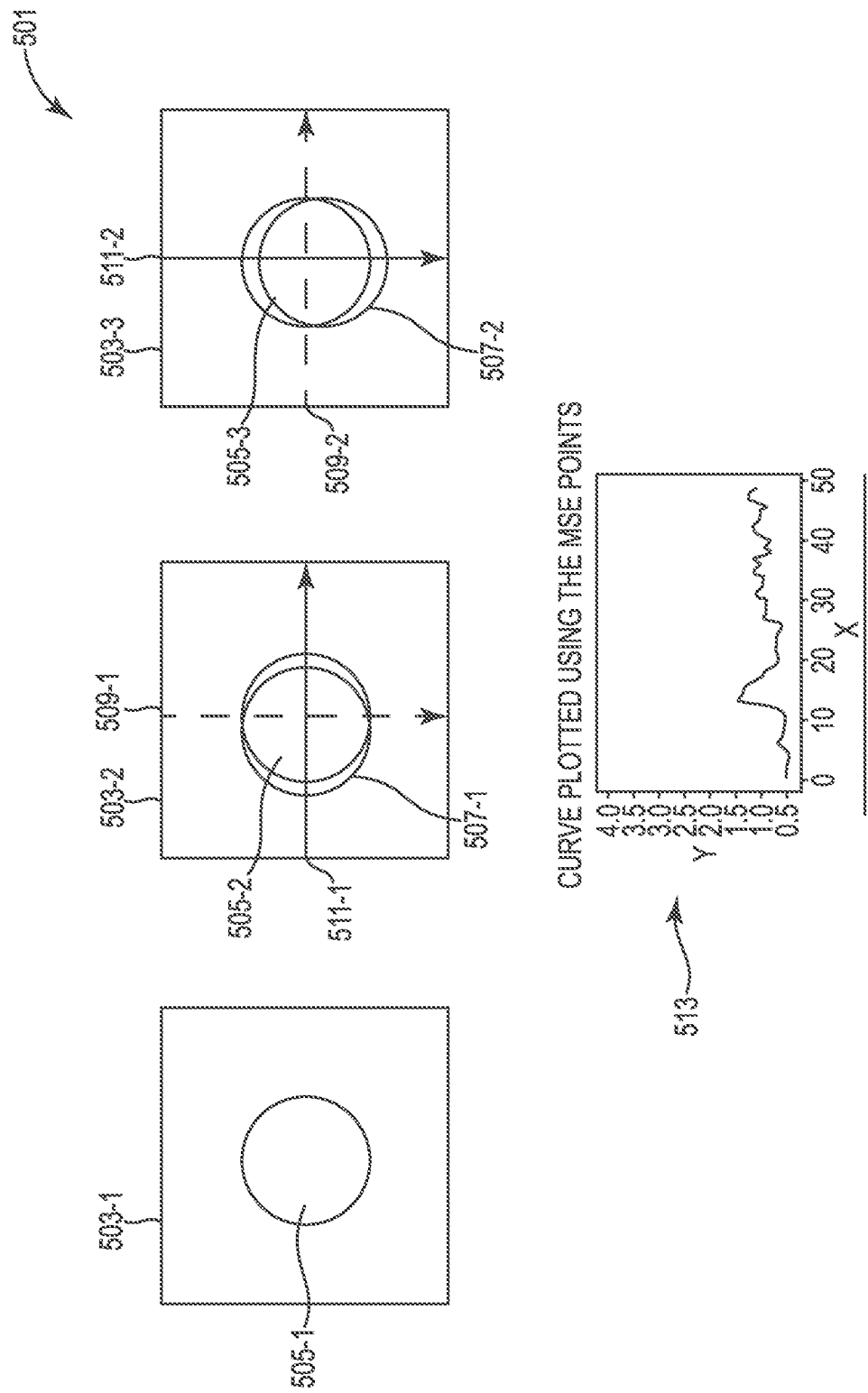

COLOR PLANE MISREGISTRATION DETERMINATIONS

BACKGROUND

A computing device allows a user to utilize computing device operations for work, education, gaming, multimedia, and/or other uses. Computing devices are utilized in a non-portable setting, such as at a desktop. In other examples, the computing device allows a user to carry or otherwise bring the computing device along while in a mobile setting. These computing devices can be connected to scanner devices, printing devices, or other devices to capture images and/or generate images on physical media.

BRIEF DESCRIPTION OF THE DRAWINGS

FIG. 5 illustrates an example of a method for color plane misregistration determinations.

DETAILED DESCRIPTION

Figure 1:
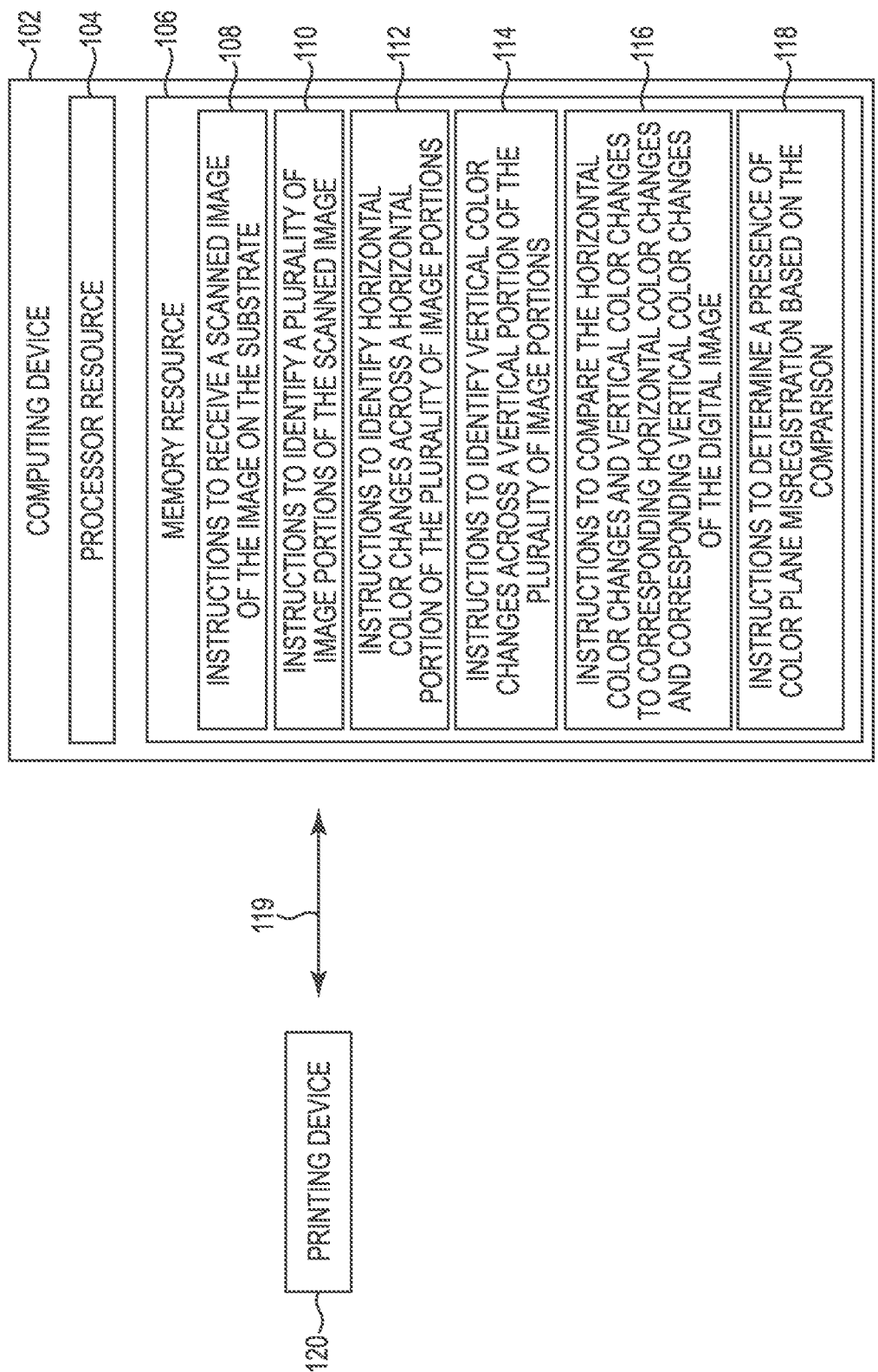
FIG. 1 illustrates an example of a computing device for color plane misregistration determinations.

A user may utilize a computing device for various purposes, such as for business and/or recreational use. As used herein, the term "computing device" refers to an electronic system having a processor resource and a memory resource. Examples of computing devices can include, for instance, a laptop computer, a notebook computer, a desktop computer, an all-in-one (AIO) computer, networking device (e.g., router, switch, etc.), and/or a mobile device (e.g., a smart phone, tablet, personal digital assistant, smart glasses, a wrist-worn device such as a smart watch, etc.), among other types of computing devices. As used herein, a mobile device refers to devices that are (or can be) carried and/or worn by a user.

The computing device may be connected to a peripheral device or be implemented within a device to perform particular functions. For example, the computing device may be part of a printing device and/or a scanner device. In this example, the computing device can provide instructions or digital images to the printing device to generate corresponding images on a substrate (e.g., physical substrate, print medium, paper, plastic, metal, etc.). In this example, the scanner device can scan images on a substrate to generate a scanned image or digital image of the images on the substrate. In some examples, the printing device can utilize a plurality of colors to generate the digital image on the substrate. For example, the printing device can utilize a combination of Cyan, Magenta, Yellow, and Black to generate a plurality of additional colors on the substrate. If a color or plurality of colors include a color plane misregistration, the image printed on the substrate may not include the same or similar properties as the digital image utilized by the printing device to generate the image.

In some examples, the printing device utilizes a print substance (e.g., ink, toner, etc.) that is deposited on to a substrate to generate the image. In some examples, the color plane misregistration refers to a color location on the substrate that does not match a color location of a digital image used to generate the image on the substrate. In some examples, the printing device can be adjusted to realign the color plane misregistration and generate images on the substrate with the correct color locations associated with a corresponding digital image. In some examples, the direction and/or magnitude of the color plane misregistration is utilized to adjust the printing device to realign the color plane.

The present disclosure relates to color plane misregistration determinations. In some examples, a computing device compares an original digital image to a scanned image of an image on a substrate. In these examples, the presence of the color plane misregistration is detected, a particular color that is misregistered is determined, and/or a magnitude of misregistration is determined. In this way, the printing device that generated the image on the substrate can be altered to alleviate the color plane misregistration.

FIG. 1 illustrates an example of a computing device 102 for color plane misregistration determinations. In some examples, the computing device 102 includes a processor 104 and a memory resource 106 to store instructions that are executed by the processor 104. In some examples, the computing device 102 includes a processor 104 and a memory resource 106 storing instructions 108, 110, 112, 114, 116, 118, that can be executed by the processor 104 to perform particular functions. In some examples, the computing device 102 is communicatively coupled to a printing device 120 through a communication path 119. In some examples, the communication path 119 allows the computing device 102 to send and receive signals (e.g., communication signals, electrical signals, etc.) with the printing device 120.

In some examples, the printing device 120 is capable of generating an image on a substrate utilizing a print substance. For example, the printing device 120 can be an inkjet printing device that can utilize ink that is deposited on paper to generate an image on the paper. In some examples, the printing device 120 generates the image on the substrate based on a digital image to be printed. In these examples, the image on the substrate is to be substantially the same as the digital image. As described herein, the printing device 120 may generate an image on the substrate that includes a color plane misregistration such that print substance of a particular color is deposited at an incorrect location on the substrate and/or on a shifted location on the substrate. For example, a particular color can be deposited at a location that is shifted a particular magnitude away from the intended location of the particular color. This can create an image on the substrate that is visually different than the digital image.

The computing device 102 includes instructions 108 stored by the memory resource 106 that is executed by the processor 104 to receive a scanned image of the image on the substrate. As described herein, the image on the substrate can be generated by the printing device 120 when the printing device 120 deposits a print substance on the substrate. In some examples, the printing device 120 utilizes a digital image to generate the image on the substrate utilizing the print substance. As described herein, the image on the substrate is intended to visually match the color and pattern of the digital image.

In some examples, the computing device 102 receives the scanned image of the image on the substrate from a scanner device. As used herein, a scanner device (e.g., glass scanner, in-line scanner, etc.) is a device that is capable of generating a scanned image (e.g., digital image, digital representation, etc.) of a substrate. For example, the scanner device can be an image scanner that optically scans a document to generate a digital representation of a document.

The computing device 102 includes instructions 110 stored by the memory resource 106 that is executed by the processor 104 to identify a plurality of image portions of the scanned image. In some examples, the scanned image of the substrate is broken up into a plurality of image portions (e.g., a plurality of blocks, etc.). In some examples, the plurality of image portions can be a designated size or shape. For example, the plurality of image portions can be 1 millimeter by 1 millimeter squares that represent a portion of the overall scanned image. In other examples, the plurality of image portions can be a particular quantity of pixels. For example, the plurality of image portions can be 30 pixels by 30 pixels in size.

In some examples, the plurality of image portions are selected based on a location of images within the scanned image. For example, the plurality of image portions can be selected based on a location of edges of objects within the scanned image. In some examples, the edges of objects can be locations where color plane misregistration are present or visually present. For example, the edges of objects within the images can include locations where a transition exists between a first color and a second color. For this reason, the color plane misregistration may be visible or more apparent at the edges of the objects compared to other locations within the scanned image.

In some examples, the computing device 102 includes instructions to align the plurality of image portions of the scanned image with a corresponding plurality of image portions of the digital image. In some examples, the plurality of image portions of the scanned image are aligned with a corresponding image portion of the digital image such that the portions of the scanned image can be compared to the corresponding digital image portion. In these examples, the scanned image portions represent an output of a printing device and the digital image portions represent an input for the printing device 120. As described further herein, the computing device 102 includes instructions to determine a vertical color difference and horizontal color difference between the plurality of image portions of the scanned image and the corresponding plurality of image portions of the digital image. In this way, the direction of the color plane misregistration can be identified.

The computing device 102 includes instructions 112 stored by the memory resource 106 that is executed by the processor 104 to identify horizontal color changes across a horizontal portion of the plurality of image portions. In some examples, the horizontal portion includes a line of pixels or multiple lines of pixels aligned in a horizontal direction across the plurality of image portions. In some examples, an analysis is performed along a horizontal axis to identify a pixel color of each pixel along the horizontal axis of the plurality of image portions.

In some examples, the horizontal color change is a change in the color of a pixel along a line of pixels aligned in a horizontal direction of the plurality of image portions. In some examples, each of the plurality of image portions is analyzed individually to identify if a color plane misregistration exists for a color of a plurality of colors utilized within the plurality of image portions. In some examples, the change in the color of the pixels along the horizontal axis is compared to a corresponding change in the color of the pixels along the horizontal axis of the digital image. In this way, the change in color of the pixels of the digital image is compared to the corresponding pixels of the image generated on the substrate utilizing the digital image.

In some examples, the computing device 102 includes instructions to apply a de-screening filter (e.g., vertical de-screening filter, etc.) on the plurality of image portions to identify the horizontal color changes. In some examples, a vertical de-screening filter is applied to the plurality of image portions to remove halftoning that is applied to the image by the printing device 120. As used herein, halftoning is a method that exploits an optical illusion by printing dots of ink of various colors or produce an appearance of shading. In some examples, removing the halftoning allows the computing device to analyze the change in color over a plurality of pixels of the image portions without being altered by the halftoning. In some examples, the halftoning is removed to calculate a more accurate color of each pixel along the horizontal plane of pixels. The vertical de-screening filter is applied prior to determining the color change in the horizontal plane of the plurality of image portions since de-screening filters may cause a blurring affect on the image, which could make it more difficult to determine the color change along the horizontal plane of the plurality of image portions.

The computing device 102 includes instructions 114 stored by the memory resource 106 that is executed by the processor 104 to identify vertical color changes across a vertical portion of the plurality of image portions. In some examples, the vertical portion includes a line of pixels or multiple lines of pixels aligned in a vertical direction across the plurality of image portions. In a similar way to the horizontal portion of the plurality of image portions, the color changes across the vertical portion of the plurality of image portions can be determined. In some examples, the color of each pixel along the line of pixels aligned in the vertical direction across the plurality of image portions is determined.

As described further herein, the color change intensity across the line of pixels aligned in the vertical direction can be utilized to generate a graphical representation. In these examples, the vertical color changes and horizontal color changes can be utilized to generate independent or separate graphical representations. In this way, a direction of the color plane misregistration can be determined based on the graphical representation of the color change.

In some examples, the computing device 102 includes instructions to apply a de-screening filter (e.g., horizontal de-screening filter, etc.) on the plurality of image portions to identify the vertical color changes. In some examples, the horizontal de-screening filter can be applied to the plurality of image portions prior to determining the color change intensity across of the line of pixels in the vertical direction. As described herein, the de-screening filter can cause a blurring of the image portions in the direction that the de-screening filter is applied. In this way, the horizontal de-screening filter is applied when performing the vertical color change intensity and the vertical de-screening filter is applied when performing the horizontal color change intensity.

In some examples, the horizontal de-screening filter is a one-dimensional Gaussian filter that is applied to the plurality of image portions in a horizontal direction. In these examples, the vertical de-screening filter is a one-dimensional Gaussian filter that is applied to the plurality of image portions in a vertical direction. In these examples, the one-dimensional Gaussian filter is applied in a single direction to allow an unfiltered direction to be utilized for determining the color change intensity. That is, the horizontal direction is unfiltered when the one-dimensional Gaussian filter is applied to the vertical direction and the vertical direction is unfiltered when the one-dimensional Gaussian filter is applied to the horizontal direction.

The computing device 102 includes instructions 116 stored by the memory resource 106 that is executed by the processor 104 to compare the horizontal color changes and vertical color changes to corresponding horizontal color changes and corresponding vertical color changes of the digital image. In some examples, the horizontal color changes or horizontal color change intensities associated with the image portions of the scanned image are compared to the corresponding horizontal color changes or horizontal color change intensities of the image portions of the digital image. This comparison can be performed for each of a plurality of colors utilized to generate the image on the substrate that was utilized to generate the scanned image. In this way, a presence of a color plane misregistration can be identified, the direction of the color plane misregistration can be identified, and a magnitude of the color misregistration can be identified based on the vertical and horizontal graphical representations.

The computing device 102 includes instructions 118 stored by the memory resource 106 that is executed by the processor 104 to determine a presence of color plane misregistration based on the comparison. As described herein, the comparison between the horizontal and vertical color changes of the scanned image and the digital image portions can be utilized to determine the presence or absence of the color plane misregistration of the printing device 120. A color plane misregistration in the horizontal direction can be identified when the color changes in the horizontal direction of the scanned image are different than the digital image. In a similar way, a color plane misregistration in the vertical direction can be identified when the vertical color changes of the scanned image are different than the digital image.

In some examples, the computing device 102 includes instructions to identify a color from a plurality of colors as a misregistered color. As described herein, the color associated with the color plane misregistration can be identified since each color of the plurality of colors can be analyzed individually with a separate horizontal and vertical color change analysis. That is, each color utilized by the printing device 120 to generate the image on a substrate used to generate the scanned image can be analyzed for horizontal and vertical color changes through a comparison to the digital image.

As described herein, the computing device 102 can include a processor 104 communicatively coupled to a memory resource 106 through a communication path. As used herein, the processor 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110, 112, 114, 116, 118. In other examples, the computing device can include instructions 108, 110, 112, 114, 116, 118, stored on a machine-readable medium (e.g., memory resource 106, non-transitory computer-readable medium, etc.) and executable by a processor 104. In a specific example, the computing device utilizes a non-transitory computer-readable medium storing instructions 108, 110, 112, 114, 116, 118, that, when executed, cause the processor 104 to perform corresponding functions.

Figure 2:
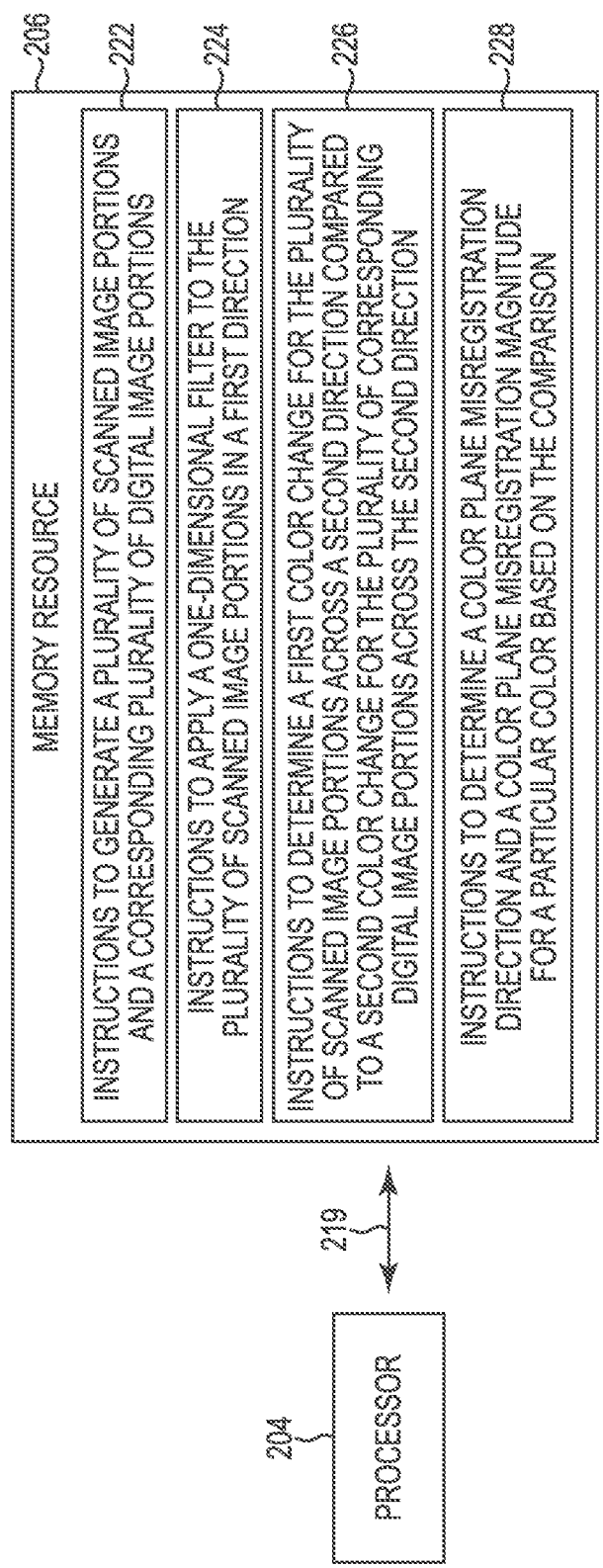
FIG. 2 illustrates an example of a memory resource storing instructions for color plane misregistration determinations.

FIG. 2 illustrates an example of a memory resource 206 storing instructions for color plane misregistration determinations. In some examples, the memory resource 206 can be a part of a computing device or controller that can be communicatively coupled to a computing system. For example, the memory resource 206 can be part of a computing device 102 as referenced in FIG. 1. In some examples, the memory resource 206 can be communicatively coupled to a processor 204 that can execute instructions 222, 224, 226, 228, stored on the memory resource 206. For example, the memory resource 206 can be communicatively coupled to the processor 204 through a communication path 219. In some examples, a communication path 219 can include a wired or wireless connection that can allow communication between devices and/or components within a single device.

The memory resource 206 may be electronic, magnetic, optical, or other physical storage device that stores executable instructions. Thus, a non-transitory machine-readable medium (MRM) (e.g., a memory resource 206) may be, for example, a non-transitory MRM comprising Random-Access Memory (RAM), read-only memory (ROM), an Electrically Erasable Programmable ROM (EEPROM), a storage drive, an optical disc, and the like. The non-transitory machine-readable medium (e.g., a memory resource 206) may be disposed within a controller and/or computing device. In this example, the executable instructions 222, 224, 226, 228, can be "installed" on the device. Additionally, and/or alternatively, the non-transitory machine-readable medium (e.g., a memory resource) can be a portable, external, or remote storage medium, for example, that allows a computing system to download the instructions 222, 224, 226, 228, from the portable/external/remote storage medium. In this situation, the executable instructions may be part of an "installation package".

In some examples, the memory resource 206 can include instructions 222 to generate a plurality of scanned image portions and a corresponding plurality of digital image portions. In some examples, the plurality of scanned image portions are generated by cropping or digitally cutting a scanned image into a plurality of portions. As describe herein, the scanned image portions can be portions of a scanned image of a substrate with a printed image on the substrate. In some examples, the plurality of digital image portions correspond to the scanned image portions such that the pixels within the digital image portions correspond to the pixels within the scanned image portions. In some examples, the pixels within the digital image portions are utilized to generate the corresponding pixels of the image printed on the substrate within the scanned image portions.

In some examples, the memory resource 206 can include instructions 224 to apply a one-dimensional filter to the plurality of scanned image portions in a first direction. As described herein, in some examples, the one-dimensional filter is a one-dimensional Gaussian filter. In some examples, the plurality of scanned image portions can be aligned such that a plurality of pixels within the plurality of scanned image portions are vertical and horizontal relative to the scanned image. In some examples, the one-dimensional filter applied to the plurality of scanned image portions is in a first direction that is either a horizontal direction or a vertical direction as described herein. In these examples, the one-dimensional filter is applied to either the vertical direction or the horizontal direction.

In some examples, the Gaussian filter is not applied to a direction that is perpendicular to the first direction. That is, the Gaussian filter is applied to the first direction, but not to a second direction that is perpendicular to the first direction. In this way, blurring to the scanned plurality of images that can be caused by the Gaussian filter is not affecting the second direction that is being analyzed.

In some examples, the memory resource 206 can include instructions 226 to determine a first color change for the plurality of scanned image portions across a second direction compared to a second color change for the plurality of corresponding digital image portions across the second direction. In some examples, the first direction is perpendicular to the second direction. In some examples, the first color change is a set of color change values along the first direction of the scanned image portions and the second color change is a set of color change values along the first direction of the digital image portions. In this way, a presence of a color plane misregistration in the first direction is identified when there is not a match or when a difference between the first color change and the second color change exceeds a threshold difference.

In some examples, the memory resource 206 can include instructions 228 to determine a color plane misregistration direction and a color plane misregistration magnitude for a particular color based on the comparison. As described herein, the color plane misregistration direction would be the first direction if there was a difference between the first color change and the second color change.

In some examples, the color plane direction also indicates a direction from a center or aligned registration value. For example, the difference between the first color change and the second color change can exist at a particular pixel between a first edge of the image portion and a second edge of the image portion. As described further herein, the first color change and the second color change can be utilized to generate a graphical representation of the difference between the scanned image portions and the digital image portions. In this way, the position of the color plane misregistration can be identified and the direction of the shift can be identified.

In addition, the particular color that is causing the color plane misregistration can be identified when each color of a plurality of colors are analyzed individually. For example, a graphical representation can be generated for each of a plurality of colors to determine when a difference in color between the scanned image and the digital image exceed a threshold difference. In this way, properties of the color plane misregistration can be identified based on the comparison. In some examples, the memory resource 206 includes instructions to provide the color plane misregistration direction and color plane misregistration magnitude to a printing device that generated an image associated with the plurality of scanned image portions from the corresponding digital image portions. In this way, a printing device can be altered to fixe or alleviate the color plane misregistration.

Figure 3:
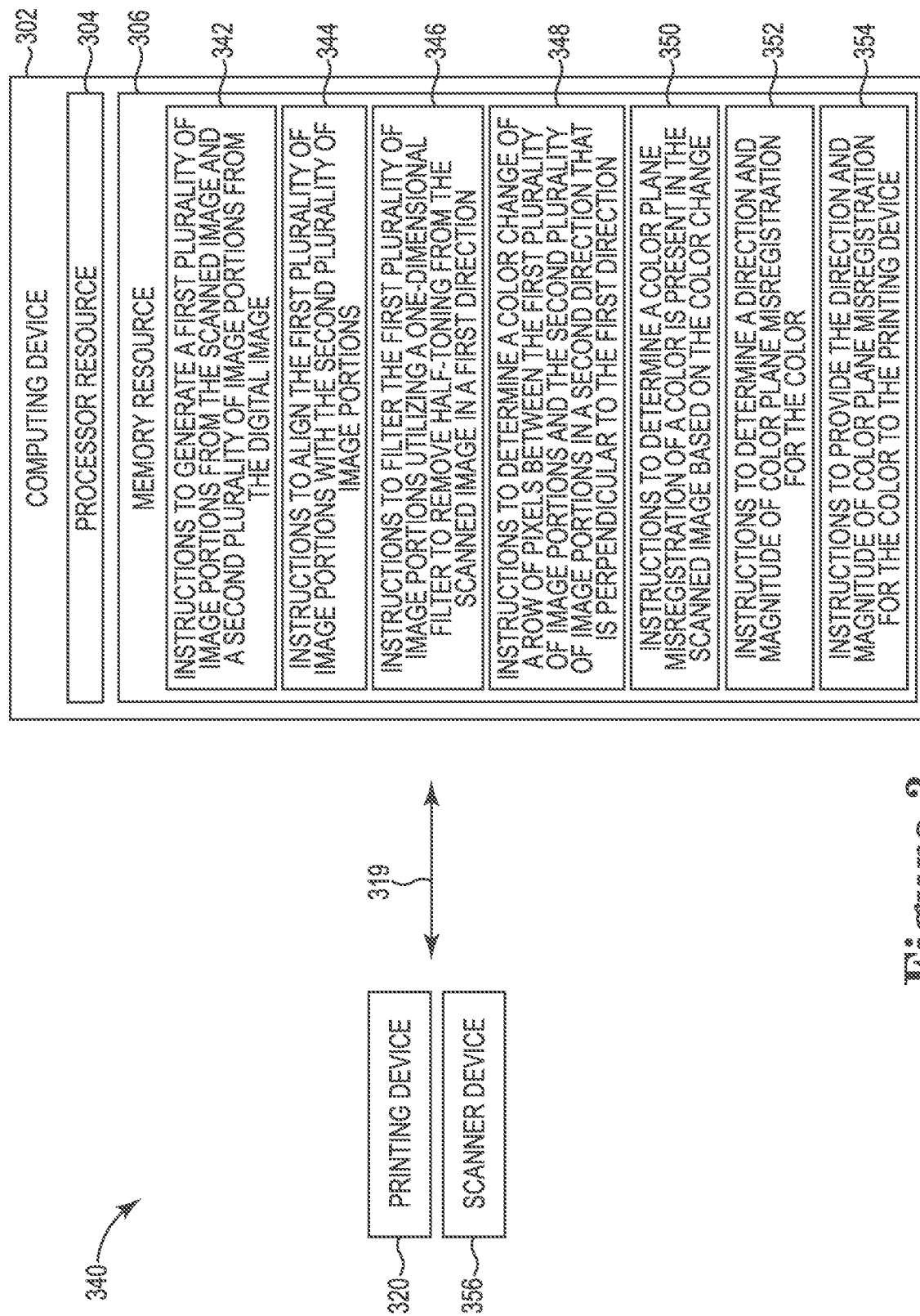
FIG. 3 illustrates an example of a system for color plane misregistration determinations.

FIG. 3 illustrates an example of a system 340 for color plane misregistration determinations. In some examples, the system 340 includes a computing device 302 that includes a processor 304 communicatively coupled to a memory resource 306. In some examples, the computing device 302 includes a processor 304 and a memory resource 306 storing instructions 342, 344, 346, 348, 350, 352, 354, that are executed by the processor 304 to perform particular functions.

In some examples, the computing device 302 is communicatively coupled to a printing device 320 and/or a scanner device 356. As described herein, the printing device 320 can generate images on a substrate by depositing a print substance on the substrate at particular locations. In some examples, the printing device 320 may include a color plane misregistration issue where the image generated on the substrate does not match a digital image used to generate the image. As described herein, the color plane misregistration issue can be a result of settings associated with the printing device 320 such that the printing device 320 is not depositing the print substance at a correct location on the substrate.

In some examples, the system 340 includes a scanner device 356. As described herein, the scanner device 356 can scan or generate a digital image of a substrate with an image printed on the substrate. In some examples, the image printed on the substrate is generated by the printing device 320. In these examples, the scanner device 356 generates a scanned image of the substrate such that the scanned image can be compared to the digital image utilized by the printing device 320 to generate the image on the substrate. In this way, the comparison can be utilized to determine when the printing device 320 includes a color plane misregistration issue.

The computing device 302 includes instructions 342 stored by the memory resource 306 that can be executed by the processor 304 to generate a first plurality of image portions from the scanned image and a second plurality of image portions from the digital image. As described herein, the first plurality of image portions can be generated by separating the scanned image into a plurality of smaller portions. In some examples, the plurality of image portions are individual portions of particular areas of the scanned image. In some examples, the plurality of image portions are a particular size and/or shape. In these examples, the second plurality of image portions can be corresponding portions of the digital image that were used to generate the first plurality of image portions. In this way, the first plurality of image portions can be aligned with the corresponding second plurality of image portions for a comparison.

The computing device 302 includes instructions 344 stored by the memory resource 306 that can be executed by the processor 304 to align the first plurality of image portions with the second plurality of image portions. As described herein, the first plurality of image portions can be aligned with the second plurality of image portions such that pixels of the first plurality of image portions are aligned with corresponding pixels of the second plurality of image portions. In this way, pixels generated by the printing device 320 on the substrate and scanned by the scanner device 356 are compared to corresponding pixels of the digital image utilized by the printing device 320 to generate the image on the substrate.

The computing device 302 includes instructions 346 stored by the memory resource 306 that can be executed by the processor 304 to filter the first plurality of image portions utilizing a one-dimensional filter to remove half-toning from the scanned image in a first direction. As described herein, the one-dimensional filter can be a de-screening filter such as a Gaussian filter that is applied one dimensionally on the first plurality of image portions. In some examples, the first direction is one of a horizontal direction relative to the image of the substrate or a vertical direction relative to the image of the substrate. In some examples, the first direction is one of a horizontal direction relative to a printing direction of the printing device 320 or a vertical direction relative to the printing direction of the printing device 320.

The computing device 302 includes instructions 348 stored by the memory resource 306 that can be executed by the processor 304 to determine a color change of a row of pixels between the first plurality of image portions and the second plurality of image portions in a second direction that is perpendicular to the first direction. In some examples, a color change of a row of pixels between the first plurality of image portions and the second plurality of image portions includes determining a magnitude of difference between each pixel in a row of pixels in the second direction between the scanned image portions and the digital image portions. In this way, the magnitude of the difference in color for each of a plurality of colors can be compared to determine when the magnitude of color difference exceeds a threshold difference. In some examples, the color plane misregistration is identified when a magnitude at a particular location or pixel along the row of pixels exceeds the threshold difference.

In some examples, the particular location can be utilized to determine the direction of the color plane misregistration for the particular color. For example, the location that exceeds the threshold distance for a particular color can indicate that the color plane misregistration for the particular color is shifted toward a first edge or a second edge in the second direction or opposite the second direction. In addition, the magnitude at the particular location can also indicate the magnitude of the color plane misregistration for the particular color.

In some examples, the computing device 302 includes instructions to filter the first plurality of image portions utilizing the one-dimensional filter to remove half-toning from the scanned image in the second direction. As described herein, the one-dimensional filter can be applied in the first direction such that the second direction can be analyzed for a color plane misregistration. In these examples, the one-dimensional filter can also be applied in the second direction such that the first direction can be analyzed for a color plane misregistration. In these examples, the computing device 302 includes instructions to determine a color plane misregistration of a row of pixels between the first plurality of image portions and the second plurality of image portions in the first direction that is perpendicular to the second direction. Determining the color plane misregistration of the row of pixels in the first direction can be similar to determining the color plane misregistration of the row of pixels in the second direction.

The computing device 302 includes instructions 350 stored by the memory resource 306 that can be executed by the processor 304 to determine a color plane misregistration of a color is present in the scanned image based on the color change. In some examples, the computing device 302 includes instructions to determine a base line removed mean-square error (MSE) to determine that the color plane misregistration of the color is present. For example, the MSE can be calculated by Equation 1.

$$MSE = MSE = \sum_{Color=C,M,Y,K} (ColorSRGB - ColorscanRGB)^2 \quad \text{Equation 1}$$

Equation 1 illustrates that the MSE for each color of Cyan (C), Magenta (M), Yellow (Y), and Black (K) by squaring the difference between a $color_{sRGB}$ and a $color_{scanRGB}$. In these examples, the $color_{sRGB}$ are CMYK color values calculated from the sRGB of original digital image using tetrahedral or trilinear interpolation (e.g., used by the printing device 320 to generate the image on the substrate) and the $color_{scanRGB}$ are CMYK color values calculated from the scan RGB of scanned image using tetrahedral interpolation In some examples, the magnitude of the shift or the magnitude of the color plane misregistration can be determined based on a range of surges of the baseline-removed MSE over the distance of the plurality of pixels. In some examples, a surge or surges of the baseline-removed MSE at a particular pixel in the vertical or horizontal direction can indicate that a color plane misregistration is located at the particular pixel or at that particular distance from an edge of the image portion. That is, when the baseline-removed MSE indicates a surge or surges at a particular point on the image indicates there is a color plane shift at that particular point.

The computing device 302 includes instructions 352 stored by the memory resource 306 that can be executed by the processor 304 to determine a direction and magnitude of color plane misregistration for the color. In some examples, the computing device 302 includes instructions to determine a largest mean absolute error (MAE) for a plurality of colors present in the scanned image to determine a specific color associated with the color plane misregistration from the plurality of colors. In some examples, the MAE can be calculated utilizing Equation 2.

$$MAE_{color} = abs(color_{sRGB} - color_{scanRGB}) \quad \text{Equation 2}$$

The Equation 2 can illustrate that the MAE for a particular color ($MAE_{color}$) can be calculated by taking the absolute value (abs) of the difference between the color value of the digital image ($color_{sRGB}$) and the color value of the scanned image ($color_{scanRGB}$). In this way, the MAE for the plurality of colors can be utilized to identify a particular color and of the color plane misregistration for the particular color. In some examples, the particular color that is associated with the color plane misregistration or with a color plane shift is a color with the highest or greatest MAE value. That is, when the MSE indicates that a color plane shift exists and the magnitude of the shift, the largest MAE value is utilized to determine the particular color by comparing the MAE value for the plurality of colors.

The computing device 302 includes instructions 354 stored by the memory resource 306 that can be executed by the processor 304 to provide the direction and magnitude of color plane misregistration for the color to the printing device 320. As described herein, the color plane misregistration information can be provided to the printing device 320 to update the settings of the printing device 320 such that images generated by the printing device 320 on a substrate more closely resemble the digital images provided to the printing device 320.

Figure 4:
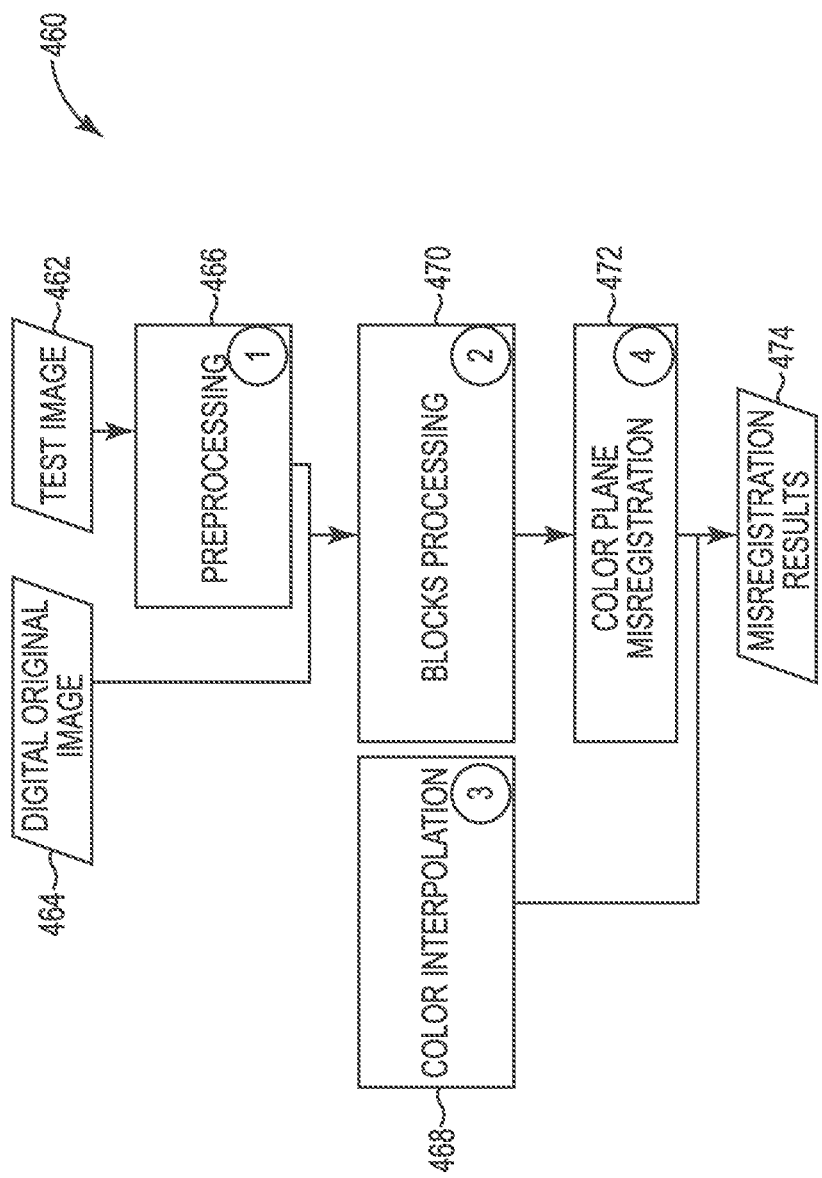
FIG. 4 illustrates an example of a method for color plane misregistration determinations.

FIG. 4 illustrates an example of a method 460 for color plane misregistration determinations. In some examples, the method 460 can be a representation of instructions that can be stored on a memory resource and executed by a processor as described herein. In some examples, the method 460 can be executed to identify a color plane misregistration of a printing device based on a comparison between a digital original image 464 and a scanned test image 462. As used herein, the digital original image 464 is a digital image utilized by a printing device to generate an image on a substrate. As used herein, the scanned test image 462 is a scanned image of the substrate with the image generated by the printing device.

In some examples, the method 460 includes preprocessing at 466. The preprocessing at 466 includes preparing the scanned image to be cropped or separated into a plurality of image portions. In some examples, the preprocessing at 466 includes scaling, margin trimming, and global alignment of the scanned test image 462. For example, the margins of the test image can include portions of a scanned test image 462 that do not include portions of the digital original image 464. As used herein, trimming the margins can include removing portions of the scanned test image 462 that are not to be utilized for comparing with the digital original image 464.

In some examples, the preprocessing at 466 includes interpolation to resize the scanned test image 462. In some examples, resizing the scanned test image 462 includes altering a size or shape of the scanned test image 462 based on an analysis process to be performed by the method 460. In other examples, the size or shape of the scanned test image 462 can be altered based on a size or resolution of the digital original image 464. For example, the size or shape of the scanned test image 462 can be altered to match the size or shape of the digital original image 464 for comparison. In some examples, the preprocessing at 466 includes image registration for the scanned test image 462. In some examples, global image alignment includes transforming or adding coordinate data associated with the scanned test image 462. In some examples, the global image alignment allows the test image to be mapped with coordinates such that pixels of the test image can be mapped to corresponding pixels of the digital original image 464.

In some examples, the method 460 includes color interpolation at 468. As used herein, the color interpolation includes a measurement of color patterns in different color modes and apply tetrahedral interpolation of the color of the scanned test image 462. In some examples, the color interpolation of a test image identifies color patterns of the scanned image such that a comparison can be made between the color of the scanned test image 462 to the color of the digital original image 464. For example, the color interpolation can be performed for different color modes on images that may not be the scanned test image 462 and/or the digital original image 464.

In some examples, the method 460 includes block processing at 470. In some examples, the block processing at 470 includes generating the plurality of image portions from the scanned test image 462 and the plurality of image portions from the digital original image 464. As described herein, the plurality of image portions from the scanned test image 462 can corresponds to the plurality of image portions from the digital original image 464. In some examples, the block processing at 470 includes cropping the scanned test image 462 and digital original image 464 into a plurality of relatively smaller blocks. For example, the scanned test image 462 can be cropped or split into a quantity of 100 individual blocks and the digital original image 464 can be cropped or split into a quantity of 100 corresponding individual blocks.

In some examples, the block processing at 470 includes identifying corner points for each of the plurality of blocks of the scanned test image 462 and for each of the plurality of blocks of the digital original image 464. In some examples, each block can include a particular quantity of corner points (e.g., 5 corner points per block, etc.). In some examples, the corner points can be defined utilizing a corner detection method such as a Harris corner detection method. As used herein, a corner detection method includes instructions to extract corners and/or features of a particular image within a boundary. For example, the corner detection method can be applied to each of the plurality of individual blocks of the digital original image 464 and the scanned test image 462. In some examples, 500 corner points can be identified when 100 blocks are utilized.

In some examples, the corner points for the scanned test image 462 and the corner points for the digital original image 464 are utilized to generate test image-digital original pairs. For example, the method 460 can include utilizing the corner points of each of the blocks as a center point. In these examples, the center point or corner points are used with a plurality of pixels of the blocks that surround the center point. For example, a 30×30 or 50×50 portion of pixels that surround the plurality of center points of each of the plurality of blocks.

In some examples, the method 460 includes utilizing a structural similarity index measure (SSIM) to filter the plurality of portion pairs. As used herein, the SSIM includes a calculation to determine structural similarities between the portion of pixels of the scanned test image 462 and the portion of pixels of the digital original image 464. In some examples, the SSIM can be a perception-based model that considers image degradation as perceived change in structural information, while also incorporating important perceptual phenomena, including both luminance masking and contrast masking terms.

In some examples, the method 460 includes generating a value (e.g., 0-1 where a 0 represents no structural similarities and 1 represents perfect structural similarities, etc.) that represents the similarity between the scanned test image 462 and the digital original image 464. In some examples, image portions that are below a threshold value can be removed or filtered out and image portions that are above the threshold value can be included or utilized for a comparison during color plane misregistration at 472. For example, image portions that are below a 0.6 value from the SSIM can be removed while image portions that are equal to or greater than 0.6 can be utilized for a comparison to determine color plane misregistration at 472.

In some examples, the method 460 includes measuring color plane misregistration at 472. In some examples, the method 460 utilizes the image portions from block processing at 470 and the color interpolation at 468 to determine when the color plane misregistration is present for the scanned test image 462. In some examples, determining the color plane misregistration at 472 include a horizontal comparison, a vertical comparison, a mean squared error (MSE) calculation, and/or a mean absolute error (MAE) calculation.

In these examples, the horizontal comparison is performed by comparing a plurality of pixels along a horizontal line or pixels along a horizontal portion of the image portions from block processing at 470. For example, the pixels along a horizontal direction from the scanned test image 462 and corresponding pixels from the digital original image 464. As described herein, a vertical de-screening operation is performed on the plurality of image portions of the scanned test image 462 prior to comparing the plurality of pixels along the horizontal line of pixels. In this way, the blurring that occurs with performing the vertical de-screening operation will not affect the comparison along the horizontal direction of the image portions.

In these examples, the vertical comparison is performed by comparing a plurality of pixels along a vertical line or pixels along a vertical portion of the image portions from block processing at 470. For example, the pixels along a vertical direction from the scanned test image 462 and corresponding vertical pixels from the digital original image 464. As described herein, a horizontal de-screening operation is performed on the plurality of image portions of the scanned test image 462 prior to comparing the plurality of pixels along the vertical line of pixels. In this way, the blurring that occurs with performing the horizontal de-screening operation will not affect the comparison along the vertical direction of the image portions.

As described herein, the values from the vertical comparison and the horizontal comparison are utilized to calculate a MSE and a MAE for each color from the scanned test image 462. In some examples, Equation 1 and Equation 2 can be utilized to calculate the MSE and MAE respectively. As described herein, the MSE can be utilized to determine a shift magnitude of the color plane misregistration and/or whether a color plane misregistration exists for the test image 462. In these examples, the MAE can be utilized to determine a specific color that is a result of a color plane misregistration for the printing device. That is, the method 460 includes determining the magnitude results at 474 by calculating the MSE and MAE respectively.

FIG. 5 illustrates an example of a method 501 for color plane misregistration determinations. In some examples, the method 501 illustrates image portions 503-1, 503-2, 503-3 that can be utilized to identify a color plane misregistration, a particular color of the color plane misregistration, and/or a magnitude or intensity of the color plane misregistration. In some examples, the image portion 503-1 can represent a digital original image portion, the image portion 503-2 can represent a first corresponding test image, and the image portion 503-3 can represent a second corresponding test image. In these examples, the image portion 503-1 illustrates an image 505-1 as intended to be printed by a printing device and illustrates the border that is intended without the presence of a color plane misregistration.

As described herein, the image portion 503-1 is compared to the image portion 503-2 and/or the image portion 503-3. As illustrated in FIG. 5, the image portion 503-2 illustrates a color plane misregistration or image shift to a left direction. For example, the image portion 503-2 includes the image 505-2 that corresponds to the image 505-1. However, the image portion 503-2 includes a shift portion 507-1 that is a particular color that is not part of the image portion 503-1. In these examples, the comparison between the image portion 503-1 and image portion 503-2 will result in a color difference at the location of the shift portion 507-1 that exceeds a threshold color difference.

In some examples, the image portion 503-2 illustrates how horizontal color plane misregistration is determined and image portion 503-3 illustrates how vertical color plane misregistration is determined. For example, the image portion 503-2 illustrates that a vertical de-screening filter 509-1 is applied to the image portion 503-2 and a horizontal color comparison 511-1 is performed along a horizontal plane of the image portion 503-2. In a similar way, a horizontal de-screening filter 509-2 is applied to the image portion 503-3 and a vertical color comparison 511-2 is performed along a vertical plane of the image portion 503-3.

In these examples, the values of the horizontal color comparison 511-1 and/or the values of the vertical color comparison 511-2 can be utilized to generate a representation 513. For example, the horizontal color comparison 511-1 can be utilized to generate a first representation and the vertical color comparison 511-2 can be utilized to generate a second representation. In these examples, the first representation can be utilized to identify the shift portion 507-1 and the second representation can be utilized to identify the shift portion 507-2.

In some examples, the representation 513 can be a graphical representation of the color difference value between the image portion 503-1 (e.g., digital original image portion, etc.) and the image portion 503-2 (e.g., first test image, etc.) or the image portion 503-3 (e.g., second test image, etc.). In some examples, x-axis of the representation 513 is a pixel location or pixel distance from an edge of the image comparison. In these examples, the y-axis of the representation 513 is an MSE of the comparison between a test image and the original digital image.

The method 501 illustrates that a shift portion 507-1, 507-2 can be identified based on the comparison to determine the presence of the color plane misregistration. In some examples, a vertical shift portion is identified when utilizing the horizontal de-screening filter while the horizontal shift portion is identified when utilizing the vertical de-screening filter.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A device, comprising:
   a printing device to generate an image on a substrate from a digital image; and
   a processor to:
   receive a scanned image of the image on the substrate;
   identify a plurality of image portions of the scanned image;
   identify horizontal color changes across a horizontal portion of the plurality of image portions;
   identify vertical color changes across a vertical portion of the plurality of image portions;
   compare the horizontal color changes and vertical color changes to corresponding horizontal color changes and corresponding vertical color changes of the digital image; and
   determine a presence of color plane misregistration based on the comparison.

2. The device of claim 1, wherein the processor is to apply a vertical de-screening filter on the plurality of image portions to identify the horizontal color changes.

3. The device of claim 1, wherein the processor is to apply a horizontal de-screening filter on the plurality of image portions to identify the vertical color changes.

4. The device of claim 1, wherein the horizontal portion includes a line of pixels aligned in a horizontal direction across the plurality of image portions and the vertical portion includes a line of pixels aligned in a vertical direction across the plurality of image portions.

5. The device of claim 1, wherein the processor is to align the plurality of image portions of the scanned image with a corresponding plurality of image portions of the digital image.

6. The device of claim 5, wherein the processor is to determine a vertical color difference and horizontal color difference between the plurality of image portions of the scanned image and the corresponding plurality of image portions of the digital image.

7. The device of claim 1, wherein the processor is to identify a color from a plurality of colors as a misregistered color.

8. A non-transitory memory resource storing machine-readable instructions stored thereon that, when executed, cause a processor of a computing device to:
   generate a plurality of scanned image portions and a corresponding plurality of digital image portions;
   apply a one-dimensional filter to the plurality of scanned image portions in a first direction;
   determine a first color plane misregistration for the plurality of scanned image portions across a second direction compared to a second color plane misregistration for the plurality of corresponding digital image portions across the second direction; and
   determine a color plane misregistration direction and a color plane misregistration magnitude for a particular color based on the comparison.

9. The memory resource of claim 8, wherein the first direction is perpendicular to the second direction.

10. The memory resource of claim 8, wherein the one-dimensional filter is a one-dimensional Gaussian filter.

11. The memory resource of claim 8, wherein the processor of the computing device is to provide the color plane misregistration direction and color plane misregistration magnitude to a printing device that generated an image associated with the plurality of scanned image portions from the corresponding digital image portions.

12. A system, comprising:
   a printing device to generate an image on a substrate from a digital image;
   a scanner device to generate a scanned image from the image on the substrate; and
   a processor to:
      generate a first plurality of image portions from the scanned image and a second plurality of image portions from the digital image;
      align the first plurality of image portions with the second plurality of image portions;
      filter the first plurality of image portions utilizing a one-dimensional filter to remove half-toning from the scanned image in a first direction;
      determine a color change of a row of pixels between the first plurality of image portions and the second plurality of image portions in a second direction that is perpendicular to the first direction;
      determine a color plane misregistration of a color is present in the scanned image based on the color change;
      determine a direction and magnitude of color plane misregistration for the color; and
      provide the direction and magnitude of color plane misregistration for the color to the printing device.

13. The system of claim 12, wherein the processor is to determine a base line removed mean-square error (MSE) to determine that the color plane misregistration of the color is present.

14. The system of claim 12, wherein the processor is to:
   filter the first plurality of image portions utilizing the one-dimensional filter to remove half-toning from the scanned image in the second direction; and
   determine a color plane misregistration of a row of pixels between the first plurality of image portions and the second plurality of image portions in the first direction that is perpendicular to the second direction.

15. The system of claim 12, wherein the processor is to determine a largest mean absolute error (MAE) for a plurality of colors present in the scanned image to determine a specific color associated with the color plane misregistration from the plurality of colors.

* * * * *